(12) United States Patent
Ojala et al.

(10) Patent No.: US 8,832,540 B2
(45) Date of Patent: Sep. 9, 2014

(54) CONTROLLING A TIME-SCALING OF AN AUDIO SIGNAL

(75) Inventors: Pasi Ojala, Kirkkonummi (FI); Ari Lakaniemi, Helsinki (FI)

(73) Assignee: Nokia Corporation, Espoo (FI)

( * ) Notice: Subject to any disclaimer, the term of this patent is extended or adjusted under 35 U.S.C. 154(b) by 2083 days.

(21) Appl. No.: 11/349,745

(22) Filed: Feb. 7, 2006

(65) Prior Publication Data

US 2007/0186145 A1    Aug. 9, 2007

(51) Int. Cl.
  *G06F 3/00* (2006.01)
  *G10L 21/04* (2013.01)
  *H04J 3/06* (2006.01)

(52) U.S. Cl.
  CPC .............. *G10L 21/04* (2013.01); *H04J 3/0632* (2013.01)
  USPC .......................................... 715/200

(58) Field of Classification Search
  USPC .......................... 715/200, 203, 234, 243, 254
  See application file for complete search history.

(56) References Cited

U.S. PATENT DOCUMENTS

| | | | |
|---|---|---|---|
| 7,171,367 B2 * | 1/2007 | Chang | 704/503 |
| 2006/0056383 A1 | 3/2006 | Black et al. | |

FOREIGN PATENT DOCUMENTS

| | | |
|---|---|---|
| EP | 1750397 | 2/2007 |
| WO | WO 2005/117366 | * 12/2005 |

OTHER PUBLICATIONS

"Voice Transformation Using Psola Technique;" H. Valbret et al; Acoustics, Speech, and Signal Processing, 1992; ICASSP-92., 1992 IEEE International Conference; publication date Mar. 23-26, 1992; vol. 1, pp. 145-148; ISBN: 0-7803-0532-9.

"High Quality Time-Scale Modification for Speech;" Salim Roucos et al; Acoustics, Speech, and Signal Processing, IEEE International Conference on ICASSP '85; publication date Apr. 1985; vol. 10, pp. 493-496.

* cited by examiner

*Primary Examiner* — Kyle Stork
(74) *Attorney, Agent, or Firm* — Alston & Bird LLP

(57) ABSTRACT

For controlling a time-scaling of an audio signal, the audio signal being distributed to a sequence of frames that are received via a packet switched network, a change in a delay of received frames is detected. Moreover, an amount of time scaling that is to be applied to received frames for compensating for the detected change is determined. Further, a kind of the change is determined. Further, a length of a time window within which a time scaling of the determined amount is to be completed is determined depending on the determined kind of the change.

20 Claims, 4 Drawing Sheets

CONTROLLING A TIME-SCALING OF AN AUDIO SIGNAL

FIELD OF THE INVENTION

The invention relates to a method for controlling a time-scaling of an audio signal. The invention relates equally to a chipset, to an audio receiver, to an electronic device and to a system enabling a control of a time-scaling of an audio signal. The invention relates further to a software program product storing a software code for controlling a time-scaling of an audio signal.

BACKGROUND OF THE INVENTION

Time-scaling an audio signal may be enabled for example in an audio receiver that is suited to receive encoded audio signals in packets via a packet switched network, such as the Internet, to decode the encoded audio signals and to playback the decoded audio signal to a user.

The nature of packet switched communications typically introduces variations to the transmission times of the packets, known as jitter, which is seen by the receiver as packets arriving at irregular intervals. In addition to packet loss conditions, network jitter is a major hurdle especially for conversational speech services that are provided by means of packet switched networks.

More specifically, an audio playback component of an audio receiver operating in real-time requires a constant input to maintain a good sound quality. Even short interruptions should be prevented. Thus, if some packets comprising audio frames arrive only after the audio frames are needed for decoding and further processing, those packets and the included audio frames are considered as lost. The audio decoder will perform error concealment to compensate for the audio signal carried in the lost frames. Obviously, extensive error concealment will reduce the sound quality as well, though.

Typically, a jitter buffer is therefore utilized to hide the irregular packet arrival times and to provide a continuous input to the decoder and a subsequent audio playback component. The jitter buffer stores to this end incoming audio frames for a predetermined amount of time. This time may be specified for instance upon reception of the first packet of a packet stream. A jitter buffer introduces, however, an additional delay component, since the received packets are stored before further processing. This increases the end-to-end delay. A jitter buffer can be characterized by the average buffering delay and the resulting proportion of delayed frames among all received frames.

A jitter buffer using a fixed delay is inevitably a compromise between a low end-to-end delay and a low number of delayed frames, and finding an optimal tradeoff is not an easy task. Although there can be special environments and applications where the amount of expected jitter can be estimated to remain within predetermined limits, in general the jitter can vary from zero to hundreds of milliseconds—even within the same session. Using a fixed delay that is set to a sufficiently large value to cover the jitter according to an expected worst case scenario would keep the number of delayed frames in control, but at the same time there is a risk of introducing an end-to-end delay that is too long to enable a natural conversation. Therefore, applying a fixed buffering is not the optimal choice in most audio transmission applications operating over a packet switched network.

An adaptive jitter buffer can be used for dynamically controlling the balance between a sufficiently short delay and a sufficiently low number of delayed frames. In this approach, the incoming packet stream is monitored constantly, and the buffering delay is adjusted according to observed changes in the delay behavior of the incoming packet stream. In case the transmission delay seems to increase or the jitter is getting worse, the buffering delay is increased to meet the network conditions. In an opposite situation, the buffering delay can be reduced, and hence, the overall end-to-end delay is minimized.

Since the audio playback component needs a regular input, the buffer adjustment is not completely straightforward, though. A problem arises from the fact that if the buffering delay is reduced, the audio signal that is provided to the playback component needs to be shortened to compensate for the shortened buffering delay, and on the other hand, if the buffering delay is increased, the audio signal has to be lengthened to compensate for the increased buffering delay.

For Voice over IP (VoIP) applications, it is known to modify the signal in case of an increasing or decreasing buffer delay by discarding or repeating a part of the comfort noise signal between periods of active speech when discontinuous transmission (DTX) is enabled. However, such an approach is not always possible. For example, the DTX functionality might not be employed, or the DTX might not switch to a comfort noise due to challenging background noise conditions, such as an interfering talker in the background.

In a more advanced solution taking care of a changing buffer delay, a signal time scaling is employed to change the length of the output audio frames that are forwarded to the playback component. The signal time scaling can be realized either inside the decoder or in a post-processing unit after the decoder. In this approach, the frames in the jitter buffer are read more frequently by the decoder when decreasing the delay than during normal operation, while an increasing delay slows down the frame output rate from the jitter buffer.

In an audio receiver that is equipped with an adaptive jitter buffer and a time scaling functionality, the network status and the buffer status are monitored constantly. Based on the status of the buffer and the network, time scale modifications are performed on an audio signal, either by adding or by removing segment(s) of the audio signal, to compensate for any change in the buffer delay.

The challenge in performing time scale modifications in active parts of the audio signal is to keep the perceived audio quality at a sufficiently high level.

SUMMARY OF THE INVENTION

It is an object of the invention to improve a time-scaling operation, which is applied to an audio signal. It is further an object of the invention to optimize the audio quality of a time scaled audio signal.

A method for time-scaling an audio signal is proposed, the audio signal being distributed to a sequence of frames that are received via a packet switched network. The method comprises detecting a change in a delay of received frames. The method further comprises determining an amount of time scaling that is to be applied to received frames for compensating for the detected change. The method further comprises determining a kind of the change. The method further comprises determining a length of a time window within which a time scaling of the determined amount is to be completed depending on the determined kind of the change.

Moreover, a chipset with at least one chip is proposed. The at least one chip comprises a time scaling control component for controlling a time-scaling of an audio signal, which audio signal is distributed to a sequence of frames that are received via a packet switched network. The time scaling control component is adapted to detect a change in a delay of received frames. The time scaling control component is further adapted to determine an amount of time scaling that is to be applied to received frames for compensating for a detected change. The time scaling control component is further adapted to determine a kind of a detected change. The time scaling control component is further adapted to determine a length of a time window within which a time scaling of the determined amount is to be completed depending on the determined kind of the change.

Moreover, an audio receiver comprising a time scaling control component for controlling a time-scaling of an audio signal is proposed. The audio signal is assumed to be distributed to a sequence of frames that are received via a packet switched network. The time scaling control component is adapted to realize corresponding functions as the time scaling control component of the proposed chipset. It has to be noted, however, that the time scaling control component can be realized by hardware and/or software. The time scaling control component may be implemented for instance in a chipset, or it may be realized by a processor executing corresponding software program code components.

Moreover, an electronic device comprising a time scaling control component for controlling a time-scaling of an audio signal is proposed. The audio signal is assumed to be distributed to a sequence of frames that are received via a packet switched network. The time scaling control component of the electronic device corresponds to the time scaling control component of the proposed audio receiver. The electronic device could be for example a pure audio processing device, or a more comprehensive device, like a mobile terminal or a media gateway, etc.

Moreover, a system is proposed, which comprises a packet switched network adapted to transmit audio signals, a transmitter adapted to provide audio signals for transmission via the packet switched network and a receiver adapted to receive audio signals via the packet switched network. The receiver corresponds to the above proposed audio receiver.

Finally, a software program product is proposed, in which a software code for controlling a time-scaling of an audio signal is stored in a readable medium. The audio signal is assumed again to be distributed to a sequence of frames that are received via a packet switched network. When being executed by a processor, the software code realizes the proposed method. The software program product can be for example a separate memory device, a memory that is to be implemented in an audio receiver, etc.

The invention proceeds from the consideration that a time scaling operation should react differently to different kinds of situations.

In general, a time scaling operation results in the best audio quality when the applied change on a time scale is as small as possible. For example, extending a 20 ms segment of an audio signal into a 25 ms segment can be expected to cause practically no quality degradation, while extending the 20 ms segment to a 40 ms segment is likely to cause some degradation in audio quality. This implies that dividing a largish time scaling request into a series of shorter scaling steps usually provides a clear advantage in terms of audio quality.

While this requirement seems to favor gradual modifications, sudden changes in the transmission delay characteristics may require immediate time scale modifications despite the previously mentioned advantage of a gradual modification. Even though performing the modifications immediately and within a short time limit might result in a certain quality degradation, a buffer overflow or underflow leading to a loss of a frame or of frames that could result with a gradual modification would still be more severe.

It is therefore proposed to employ a windowed time scaling operation and to control the time scaling by providing not only the required amount of time scaling but in addition a length of a time window, that is, a time limit in which the scaling must be performed. This allows the time-scaling to be performed in as many small steps as fit into the time window.

It is an advantage of the invention that the trade-off between the buffering delay and the amount of delayed audio frames can be maintained in an optimal way. Changes in transmission characteristics requiring different buffer adaptation strategies can be taken into account by a corresponding control of the time scaling. This improves the audio quality resulting with the time scaling operation.

The determined kind of a change is either a kind requiring a shorter time window for a determined amount of time scaling or a kind permitting a longer time window for a determined amount of time scaling.

A kind of a change requiring a shorter time window may be determined to be given, for example, in case a change in delay is detected, which exceeds a predetermined value.

Such a significant change may be indicative of a change of the 'static' transmission delay in the packet switched network. Alternatively or in addition, a kind of a change requiring a shorter time window may be determined to be given, for example, in case a delay spike is detected.

A kind of a change requiring a longer time window may be determined to be given, for example, in case a changed amount of delayed frames is detected. Such a change may be indicative of a changed jitter in the packet switched network. If received frames are buffered in a variable buffer upon reception, alternatively or in addition a kind of a change permitting a longer time window may be determined to be given, for example, in case a gradually changing buffer occupancy is detected. Such a change of buffer occupancy may be indicative of a clock drift between transmitter and receiver.

Received frames may be time-scaled by the determined amount within a time window of the determined length. The actual scaling may be carried out in any suitable way. Each scaling period may correspond for instance to a suitable multiple of a pitch period.

It is to be understood that the time scaling does not necessarily have to be performed exactly on those frames that are actually received with a changed delay and for which a delay change is detected. At least in some systems and implementations, the changed delay of received frames may be determined for instance based on reception statistics and thus not based on the delay of single frames in the first place.

For the actual time scaling, it may further be considered that the audio quality resulting after a time scale modification is not the same for all audio contents. For example, for speech signals certain frame types, such as transient frames or voiced onsets, are advantageously handled with care in order not to degrade the audio quality. This implies that with strict quality criteria, the best results might be achieved by prohibiting the scaling of certain frames. In particular in case the determined length of the time window is longer, the type of content of the frames within the determined time window might therefore be determined in addition. A time scaling of those frames within the time window, which have a content of a predetermined type, can then be avoided.

The time-scaling might not be applied directly to the received frames, but rather to processed received frames.

The received frames may for instance be buffered in a variable buffer upon reception and retrieved from the variable buffer for decoding. The decoded frames may then be subjected to the time scaling. This alternative is particularly suited for the case that the time scaling is realized in a dedicated processing block, that is, either in a delimited hardware circuit or a delimited software code.

Alternatively, the time scaling could be realized for example in combination with another processing function, like a decoding or transcoding function. Combining a pitch-synchronous scaling technique with a speech decoder, for instance, is a particularly favorable approach to provide a high-quality time scaling capability. For example, with an AMR codec this provides clear benefits in terms of low processing load.

If the time scaling is combined with the decoding, the received frames may equally be buffered in a variable buffer upon reception and retrieved from the variable buffer for decoding. In this case, however, the frames that are subjected to the time scaling may be frames including a linear prediction (LP) synthesis filter excitation signal generated in the decoding.

The invention can be applied to any type of audio codec, in particular, though not exclusively, to any type of speech codec. Further, it can be used for instance for AMR and VoIP.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
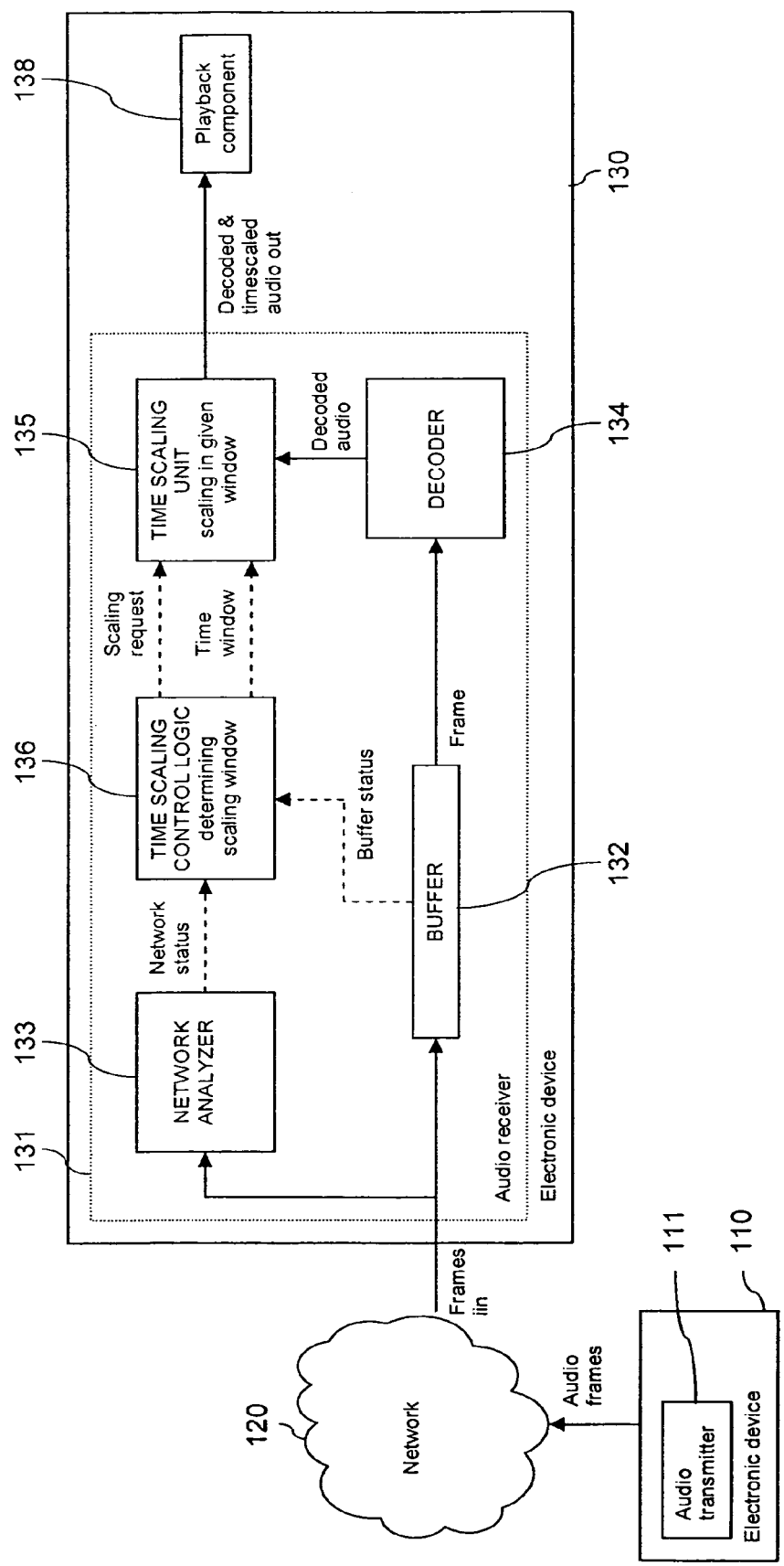
FIG. 1 is a schematic block diagram of a transmission system according to an embodiment of the invention.

FIG. 1 is a schematic block diagram of an exemplary transmission system, in which an enhanced time-scaling according to an embodiment of the invention may be implemented.

The system comprises an electronic device 110 with an audio transmitter 111, a packet switched communication network 120 and an electronic device 130 with an audio receiver 131. The audio transmitter 111 may transmit audio frames including encoded audio data via the packet switched communication network 120 to the audio receiver 131, each packet comprising an audio frame with encoded audio data.

The input of the audio receiver 131 is connected within the audio receiver 131 on the one hand to a jitter buffer 132 and on the other hand to a network analyzer 133. The jitter buffer 132 is connected via a decoder 134 and a time scaling unit 135 to the output of the audio receiver 131. A control signal output of the network analyzer 133 is connected to a first control input of a time scaling control logic 136, while a control signal output of the jitter buffer 132 is connected to a second control input of the time scaling control logic 136. A control signal output of the time scaling control logic 136 is further connected to a control input of the time scaling unit 135.

The output of the audio receiver 131 may be connected to a playback component 138 of the electronic device 130, for example to loudspeakers.

The jitter buffer 132 is used to store received audio frames waiting for decoding and playback. The jitter buffer 132 may have the capability to arrange received frames into the correct decoding order and to provide the arranged frames—or information about missing frames—in sequence to the decoder 134 upon request. In addition, the jitter buffer 132 provides information about its status to the time scaling control logic 136. The network analyzer 133 computes a set of parameters describing the current reception characteristics based on frame reception statistics and the timing of received frames and provides the set of parameters to the time scaling control logic 136. Based on the received information, the time scaling control logic 136 determines the need for a changing buffering delay and gives corresponding time scaling commands to the time scaling unit 135. The used average buffering delay does not have to be an integer multiple of the input frame length. The optimal average buffering delay is the one that minimizes the buffering time without any frames arriving late.

The decoder 134 retrieves an audio frame from the buffer 132 whenever new data is requested by the playback component 138. It decodes the retrieved audio frame and forwards the decoded audio frame to the time scaling unit 135. The time scaling unit 135 performs a scaling commanded by the time scaling control logic 136, that is, it may lengthen or shorten the received decoded frames. The decoded and possibly time scaled frames are provided to the playback component 138 for presentation to a user.

It is to be understood that the presented architecture of the audio receiver 131 of FIG. 1 is only intended to illustrate the basic logical functionality of an exemplary audio receiver according to the invention. In a practical implementation, the represented functions can be allocated differently to processing blocks. Some processing block of an alternative architecture may combine several ones of the functions described above. A time scaling unit combined with a decoder, for example, can provide a computationally very efficient solution. Furthermore, there may be additional processing blocks, and some components, like the buffer 132, may even be arranged outside of the audio receiver 131.

The presented system may be implemented just like a conventional system in which audio data is transmitted from an audio transmitter to an audio receiver, except for the time scaling control logic 136 and the time scaling unit 135 of the audio receiver 131.

Figure 2:
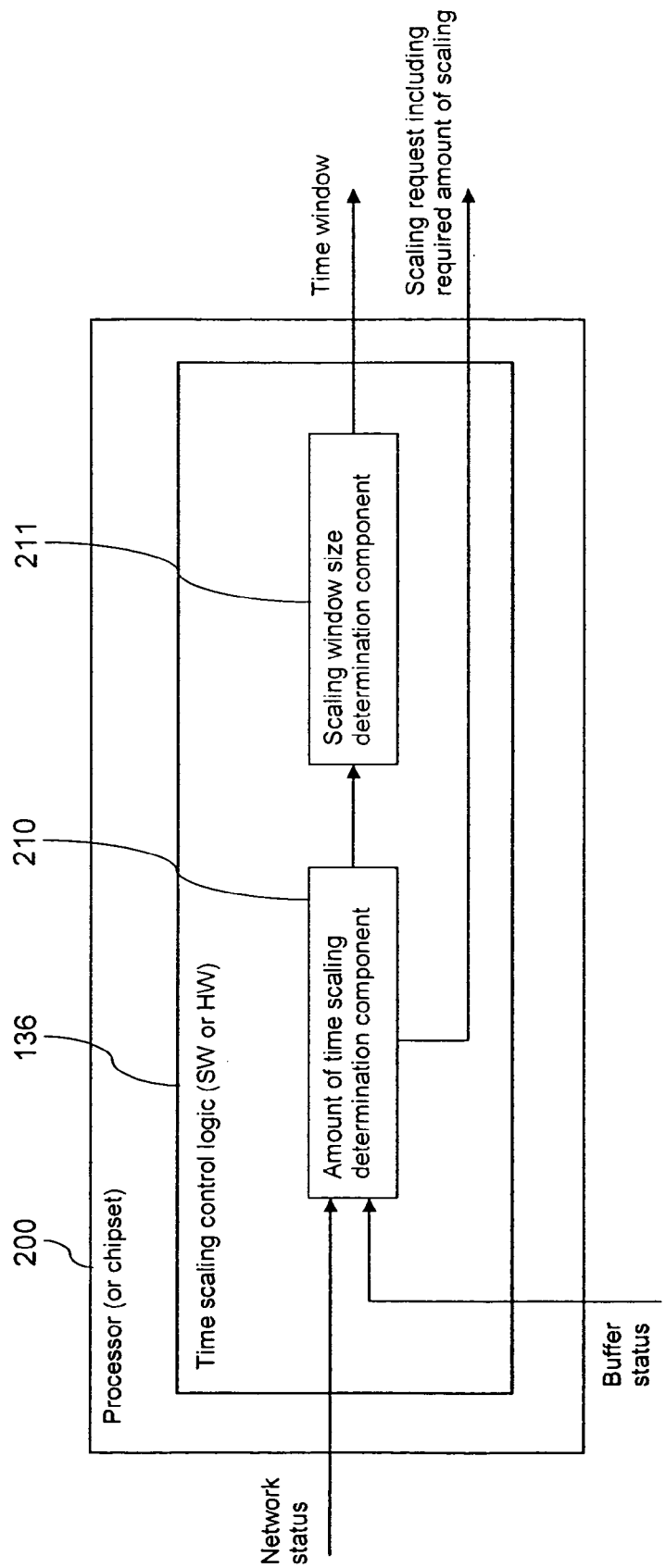
FIG. 2 illustrates details of an audio receiver of the system of FIG. 1.

Functional details of the time scaling control logic 136 are presented in FIG. 2.

The time scaling control logic 136 may be implemented by a software code that can be executed by a processor 200 of the electronic device 131. It is to be understood that the same processor 200 could execute in addition software codes realizing other functions of the audio receiver 131 or, in general, of the electronic device 130. It has to be noted that, alternatively, the functions of the time scaling control logic 136 could be realized by hardware, for instance by a circuit integrated in a chip or a chipset.

The time scaling control logic 136 comprises an 'amount of time scaling' determination component 210 and linked to this determination component 210 a 'length of time window' determination component 211. The control inputs of the time scaling control logic 136 that are connected to the network analyzer 133 and to the jitter buffer 132, respectively, are both linked to the determination component 210. The determination component 210 outputs a scaling request that is fed to the time scaling unit 135. The determination component 211 outputs a time window length that is fed to the time scaling unit 135.

Figure 3:
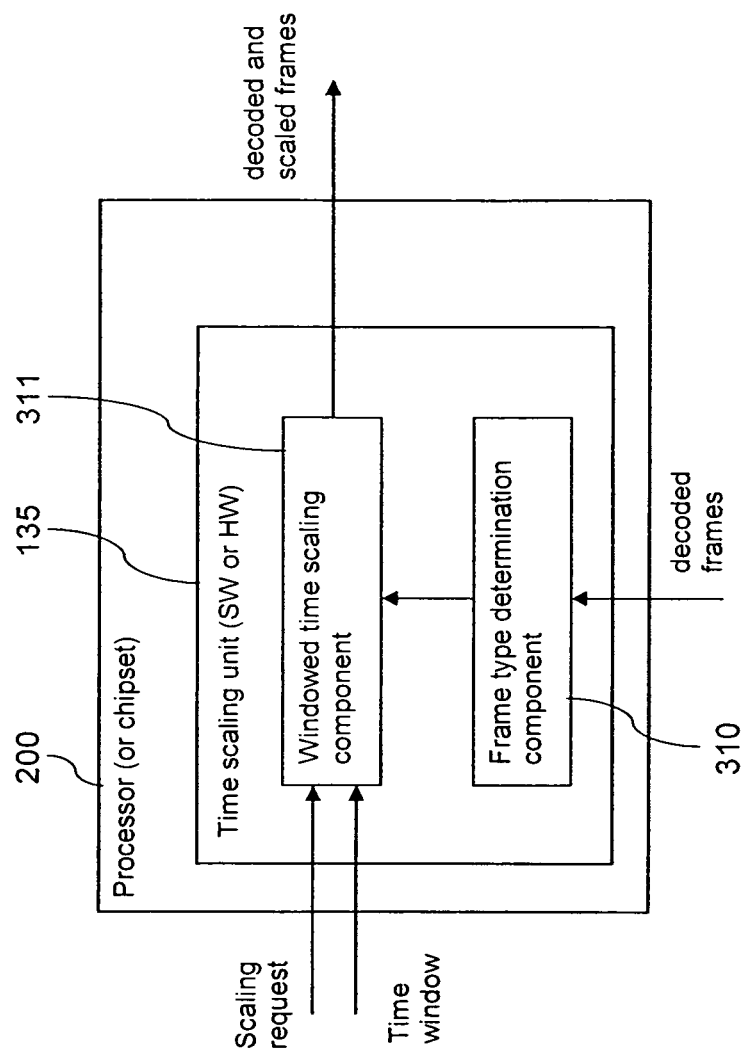
FIG. 3 illustrates further details of an audio receiver of the system of FIG. 1.

Functional details of the time scaling unit 135 are presented in FIG. 3.

The time scaling unit 135 may equally be implemented by a software code that can be executed by a processor 200 of the electronic device 131. It is to be understood that the same processor 200 could execute in addition software codes realizing other functions of the audio receiver 131 or, in general, of the electronic device 130. In particular, a software code realizing the functions of the time scaling unit 135 may be executed by the same processor 200 as a software code realizing the functions of the time scaling control logic 136. It has to be noted that, alternatively, also the functions of the time scaling unit 135 could be realized by hardware, for instance by a circuit integrated in a chip or a chipset, possibly the same chip or chipset in which the functions of the time scaling control logic 136 are integrated.

The time scaling unit 135 comprises a 'frame type' determination component 310 and linked to this determination component 310 a 'windowed time scaling' component 311. The control signal outputs of the time scaling unit 136 for the scaling request and the time window length are both linked to the 'windowed time scaling' component 311. The output of the decoder 134 is linked to the determination component 310. The 'windowed time scaling' component 311 outputs decoded and scaled frames that are fed to the playback component 138.

If the time scaling unit 135 is operating as a separate processing block as illustrated, the described time scale modification is usually performed on the decoded speech signal. If the time scaling unit 135 is combined with the decoder 134, the described time scale modification can be performed for instance on the LP synthesis filter excitation signal generated in the decoder 134.

Figure 4:
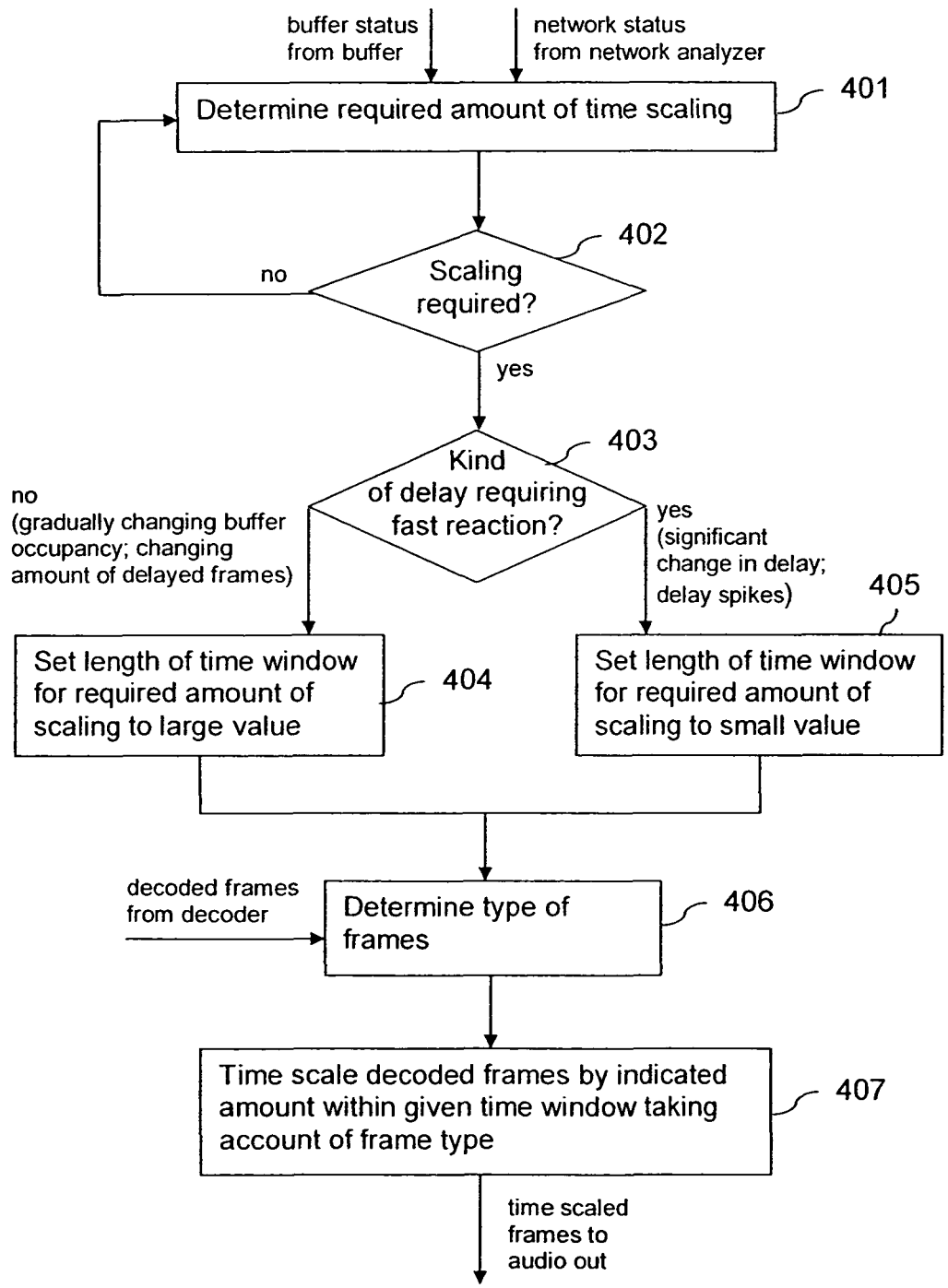
FIG. 4 is a flow chart illustrating an operation in the audio receiver of FIG. 1.

A time scaling control according to an exemplary embodiment of the invention will now be described with reference to the flow chart of FIG. 4. Indicated steps 401 to 405 are carried out by the time scaling control logic 136, while indicated steps 406 and 407 are carried out by the time scaling unit 135.

The time scaling control logic 136 receives information on the network status from the network analyzer 133 and information on the buffer status from the jitter buffer 132. Based on this information, the determination component 210 determines whether a change of the buffering delay is impending and, if so, it determines in addition the amount of time scaling that is required for compensating for the change (step 401). When network characteristics and buffer status indicate an increasing delay, some frames have to be lengthened by an appropriate amount so that the playback component 138 requests new data at a lower rate in order to prevent a buffer underflow while the buffering delay is being increased. When network characteristics and buffer status indicate a decreasing delay, some frames have to be shortened by an appropriate amount so that the playback component 138 requests new data at a higher rate in order to prevent a buffer overflow while the buffering delay is being decreased.

The determination component 210 informs the determination component 211 about any required time scaling and as well about the current network and buffer status. In addition, it generates a time scaling request including the required amount of time scaling and provides it to the time scaling unit 135.

In case a time-scaling is required (step 402), the determination component 211 determines whether the kind of the changed delay requires a fast reaction (step 403).

The determination component 211 may differentiate to this end for example between a clock drift, changes in a 'static' transmission delay, changing jitter and delay spikes, as will be explained in the following.

In some cases the clocks that are driving the operation at the transmitter 111 and the receiver 131 are not synchronised due to the fact that the clock signal is not completely accurate. There can be a small deviation that makes the real clock rate slightly different from the nominal value, resulting in a clock drift. If the transmitter clock runs faster than the receiver clock, the frames seem to arrive at the receiver 131 at too short intervals, and this is seen at the receiver 131 by gradually growing buffer occupancy and by increasing average buffering delay. On the other hand, if the transmitter clock is running slower than the receiver clock, the frames seem to arrive at the receiver 131 at too long intervals, and this will cause slowly decreasing buffer occupancy and decreasing average buffering delay. If this phenomenon is not taken care of, it will sooner or later result in a buffer overflow or underflow.

This first considered aspect can be detected by the determination component 211 by watching out for gradually changing buffer occupancy.

A change in the 'static' transmission delay may occur if the network load suddenly changes. As a result, there may be a significant change in delay that requires buffer adaptation. A clear increase in delay is likely to introduce a buffer underflow, while sudden decrease in delay may cause a buffer overflow.

This second considered aspect can be detected by the determination component 211 by watching out for a clear change in the delay of received packets.

A change in the network load may also be seen as changing jitter instead of changes in the static delay component. Changing jitter might actually be a much more common phenomenon than a changing static delay. In this scenario, an increasing jitter will cause an increasing amount of late-arriving frames if the buffering delay is not increased accordingly. On the other hand, a decreasing trend in jitter will reduce the number of lost frames due to late arrival, which can be exploited for reducing the buffering delay.

This third considered aspect can be detected by the determination component 211 by evaluating the amount of frames that are arriving late.

A very short term 'disturbance' in the network 120 can be seen in the receiver 131 as a delay spike, that is, a short period of no packets at all are followed by a burst of packets.

This fourth considered aspect can be detected by the determination component 211 by evaluating the distribution of the reception time of packets.

The same pace of modification would not result in the best possible audio quality in all scenarios listed above. Clock drift and changing jitter are typically such that they can be taken care of by gradual modifications, which is per se the best approach for maintaining a high audio quality. A changing static transmission delay and delay spikes, on the other hand, require a fast reaction to minimize the degradation in audio quality due to lost packages.

In case it is detected that a fast reaction is not necessary (step 403), the determination component 211 sets the length of a time window for the required amount of scaling to a large value and provides this value to the time scaling unit 135 (step 404). The large value is suited to command the time scaling unit 135 to perform the required amount of time scaling over a relatively long modification period.

In case it is detected that a fast reaction is required (step 403), the determination component 211 sets the length of a time window for the required amount of scaling to a small value and provides this value to the time scaling unit 135 (step 405). The small value is suited to command the time scaling unit 135 to perform the required amount of time scaling immediately and within a short modification period.

It is to be understood that in both cases, the selected window size may depend in addition on other criteria as well. It may depend for instance in addition on the required amount of time scaling, since a large amount of scaling and a small amount of scaling within the same time window will obviously have different effects.

The time scaling unit 135 receives decoded audio frames from the decoder 134. In addition, it receives the scaling command and the associated length of a time window from the time scaling control logic 136.

The determination component 310 checks the type of the currently received decoded frames for detecting frames that have particular requirements on the audio quality, like transient frames or frames with voiced onsets (step 406).

The windowed time scaling component 311 of the time scaling unit 135 then applies a time scaling to the received decoded frames (step 407).

The time scaling is performed by the requested amount within the indicated time window. The windowed time scaling component 311 selects appropriate frames for the time scaling and optimal modification points within the frames selected for time scaling.

In principle, the time scaling begins with the first frame that is received after a new scaling command. If the combination of the amount of time scaling and the indicated window size do not imply a fast reaction is required, however, the windowed time scaling component 311 takes care that a time scaling of sensitive frames detected by determination component 310 is avoided.

Typically, the signal extension or contraction is done as multiples of pitch cycles. An example of a suitable time scaling can be found in the document "High quality time-scale modification for speech" by S. Roucos and A. M. Wilgus, IEEE ICASSP 1985, pages 493-496. It is to be understood, however, that other time-scaling approaches can be employed as well.

It has to be noted that the amount of time scaling might not only be given by an absolute amount of a required scaling that is to be achieved with frames received within the given time window. The amount of time scaling could also indicate, for instance, how many time-scaled frames should fit into the indicated time window. Thus, the length of the time window might either limit the number of considered frames before time scaling or define the spread of the frames resulting with the time scaling.

It might further be noted that an alternative approach, in which the time scaling control logic 136 distributes a bigger scaling request into a series of smaller ones, is less beneficial than the proposed windowing. The reason is that the time scaling unit 135 has knowledge about the current signal characteristics, and it is therefore capable of making the decision on the exact scaling point that minimizes the audio quality degradation.

Overall, the adaptive jitter buffer should take into account the underlying network conditions, the decoder operation, and the time scaling unit performance.

While there have been shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising:
    detecting at an apparatus a change in a delay of frames that are received via a packet switched network, the frames belonging to a sequence of frames to which an audio signal is distributed;
    determining an amount of time scaling that is required to be applied to received frames for compensating for said detected change;
    determining a kind of said change by evaluating at least a change in the amount of delayed frames; and
    determining a length of a time window within which a time scaling of said required amount is to be completed depending on said determined kind of said change.

2. The method according to claim 1, wherein a determined kind of said change is either a kind requiring a shorter time window for a determined amount of time scaling or a kind permitting a longer time window for a determined amount of time scaling.

3. The method according to claim 2, wherein a kind of a change requiring a shorter time window is determined to be given at least in case one of a change in delay, which change exceeds a predetermined value, and a delay spike is detected.

4. The method according to claim 2, wherein received frames are buffered in a variable buffer upon reception and wherein a kind of a change permitting a longer time window is determined to be given at least in case a gradually changing buffer occupancy is detected.

5. The method according to claim 1, comprising a subsequent step of time scaling received frames by said determined amount within a time window of said determined length.

6. The method according to claim 5, further comprising determining a type of content of said frames within said time window and avoiding a time scaling of those frames within said time window, which frames have a content of a predetermined type.

7. The method according to claim 5, wherein said time-scaling is applied to received frames after a preceding processing of said received frames.

8. The method according to claim 5, wherein received frames are buffered in a variable buffer upon reception and retrieved from said variable buffer for decoding, and wherein frames that are subjected to said time scaling are decoded frames.

9. The method according to claim 5, wherein received frames are buffered in a variable buffer upon reception and retrieved from said variable buffer for decoding, and wherein frames that are subjected to said time scaling are frames including a linear prediction synthesis filter excitation signal generated in said decoding.

10. An apparatus comprising
    a chip including a circuit, the circuit configured to cause the apparatus at least to perform or
    a processor and a memory including a software code, the memory and the software code configured to, with the processor, cause the apparatus at least to perform:

detect a change in a delay of received frames of an audio signal, the audio signal being distributed to a sequence of frames that are received via a packet switched network;

determine an amount of time scaling that is required to be applied to received frames for compensating for a detected change;

determine a kind of a detected change by evaluating at least a change in the amount of delayed frames; and determine a length of a time window within which a time scaling of said required amount is to be completed depending on said determined kind of said change.

11. The apparatus according to claim 10, wherein a determined kind of said change is either a kind requiring a shorter time window for a determined amount of time scaling or a kind permitting a longer time window for a determined amount of time scaling.

12. The apparatus according to claim 10, wherein the circuit is further configured to or the memory and the software code is further configured to, with the processor, cause the apparatus to time scale received frames by a determined amount within a time window of a determined length.

13. The apparatus according to claim 12, wherein the circuit is further configured to or the memory and the software code is further configured to, with the processor, cause the apparatus to determine a type of content of frames within said time window and to avoid a time scaling of those frames within said time window, which frames have a content of a predetermined type.

14. A system comprising a packet switched network configured to transmit audio signals, a transmitter configured to provide audio signals for transmission via said packet switched network and a receiver configured to receive audio signals via said packet switched network, the audio signal being distributed to a sequence of frames, said receiver including a chip including a circuit, the circuit configured to cause the receiver at least to perform or a processor and a memory including a software code, the memory and the software code configured to, with the processor, cause the receiver at least to perform:

detect a change in a delay of received frames;

determine an amount of time scaling that is required to be applied to received frames for compensating for a detected change;

determine a kind of a detected change by evaluating at least a change in the amount of delayed frames; and determine a length of a time window within which a time scaling of said required amount is to be completed depending on said determined kind of said change.

15. A software program product in which a software code is stored on a non-transitory computer readable media, wherein said software code realizes the following when being executed by a processor:

detecting a change in a delay of fames that are received via a packet switched network, the frames belonging to a sequence of frames to which an audio signal is distributed;

determining an amount of time scaling that is required to be applied to received frames for compensating for said detected change;

determining a kind of said change by evaluating at least a change in the amount of delayed frames; and determining a length of a time window within which a time scaling of said required amount is to be completed depending on said determined kind of said change.

16. The software program product according to claim 15, wherein a determined kind of said change is either a kind requiring a shorter time window for a determined amount of time scaling or a kind permitting a longer time window for a determined amount of time scaling.

17. The software program product according to claim 15, wherein when being executed by a processor said software code realizes a subsequent step of time scaling received frames by said determined amount within a time window of said determined length.

18. The apparatus according to claim 11, wherein the circuit is further configured to or the memory and the software code is further configured to, with the processor, cause the apparatus to determine a kind of a change requiring a shorter time window to be given at least in case one of a change in delay, which change exceeds a predetermined value, and a delay spike is detected.

19. The apparatus according to claim 11, comprising a variable buffer adapted to buffer received frames upon reception, wherein the circuit is further configured to or the memory and the software code is further configured to, with the processor, cause the apparatus to determine a kind of a change permitting a longer time window to be given at least in case a gradually changing buffer occupancy is detected.

20. The apparatus according to claim 10, wherein said apparatus is one of a chipset with at least one chip, an audio receiver and an electronic device.

* * * * *

UNITED STATES PATENT AND TRADEMARK OFFICE
CERTIFICATE OF CORRECTION

| | | |
|---|---|---|
| PATENT NO. | : 8,832,540 B2 | Page 1 of 1 |
| APPLICATION NO. | : 11/349745 | |
| DATED | : September 9, 2014 | |
| INVENTOR(S) | : Ojala et al. | |

It is certified that error appears in the above-identified patent and that said Letters Patent is hereby corrected as shown below:

In the Claims

<u>Column 12, Claim 15,</u>
Line 8, "delay of fames" should read --delay of frames--.

Signed and Sealed this
Tenth Day of February, 2015

Michelle K. Lee
*Deputy Director of the United States Patent and Trademark Office*